(12) United States Patent
Liang et al.

(10) Patent No.: US 11,024,854 B2
(45) Date of Patent: *Jun. 1, 2021

(54) CURRENT COLLECTOR, ELECTRODE PLATE OF THE SAME AND BATTERY

(71) Applicant: CONTEMPORARY AMPEREX TECHNOLOGY CO., LIMITED, Ningde (CN)

(72) Inventors: Chengdu Liang, Ningde (CN); Huafeng Huang, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,425

(22) Filed: Dec. 4, 2018

(65) Prior Publication Data

US 2019/0173089 A1 Jun. 6, 2019

(30) Foreign Application Priority Data

Dec. 5, 2017 (CN) .......................... 201711267487.X

(51) Int. Cl.
*H01M 4/66* (2006.01)
*H01M 2/34* (2006.01)
(Continued)

(52) U.S. Cl.
CPC ............ *H01M 4/661* (2013.01); *H01M 4/64* (2013.01); *H01M 4/662* (2013.01); *H01M 4/663* (2013.01);
(Continued)

(58) Field of Classification Search
None
See application file for complete search history.

(56) References Cited

U.S. PATENT DOCUMENTS

| 8,399,113 B2 * | 3/2013 | Nakura | H01M 2/348 |
| | | | 429/163 |
| 2006/0105243 A1 * | 5/2006 | Okamura | H01M 4/64 |
| | | | 429/234 |

(Continued)

FOREIGN PATENT DOCUMENTS

CN 107369810 11/2017
EP 3 367 485 A1 8/2018
(Continued)

OTHER PUBLICATIONS

European Search Report, issued in European Application No. 18200693.2 (10 pages).
(Continued)

*Primary Examiner* — Wyatt P McConnell
(74) *Attorney, Agent, or Firm* — Haynes and Boone, LLP

(57) ABSTRACT

The present application relates to a current collector, an electrode plate, a battery and usages thereof. The current collector includes at least one conductive layer configured to support an electrode active material layer, and an insulation layer configured to support the at least one conductive layer. The conductive layer has a room temperature film resistance $R_S$ satisfying $0.01\Omega/\square \leq R_S \leq 0.15\Omega/\square$. The current collector can significantly increase resistance in short-circuit and reduce current in the short-circuit, and reduce heat generated during the short-circuit and improving safety performance. The heat can be totally absorbed by the battery. Therefore, the resulted temperature rise of the battery is small, the damage to the battery caused by the short circuit can be limited to a "point", and only a "point break" is formed, without influencing normal operation of the battery in a short time.

11 Claims, 5 Drawing Sheets

(51) Int. Cl.
- *H01M 10/48* (2006.01)
- *H01M 10/0525* (2010.01)
- *H01M 10/052* (2010.01)
- *H01M 10/42* (2006.01)
- *H01M 4/64* (2006.01)
- *H01M 50/581* (2021.01)

(52) U.S. Cl.
CPC ........... *H01M 4/664* (2013.01); *H01M 4/667* (2013.01); *H01M 10/052* (2013.01); *H01M 10/0525* (2013.01); *H01M 10/4235* (2013.01); *H01M 10/486* (2013.01); *H01M 50/581* (2021.01)

(56) References Cited

U.S. PATENT DOCUMENTS

| | | | | |
|---|---|---|---|---|
| 2010/0015514 A1* | 1/2010 | Miyagi | ............... | H01M 10/052 429/129 |
| 2011/0052985 A1* | 3/2011 | Kashiwazaki | ......... | H01G 11/38 429/217 |
| 2012/0052378 A1* | 3/2012 | Torata | .................... | H01M 4/13 429/209 |
| 2013/0017441 A1* | 1/2013 | Affinito | ............... | H01M 2/1673 429/211 |
| 2016/0149261 A1 | 5/2016 | Zaghib et al. | | |
| 2016/0190566 A1 | 6/2016 | Shiozaki et al. | | |
| 2017/0309951 A1* | 10/2017 | Ishikawa | ................. | H01M 2/34 |
| 2018/0301709 A1* | 10/2018 | Qiu | ....................... | C23C 14/568 |

FOREIGN PATENT DOCUMENTS

| | | |
|---|---|---|
| JP | H11 67221 A | 3/1999 |
| JP | 2009-064767 | 3/2009 |
| JP | 2010-040489 | 2/2010 |
| JP | 2012-129114 A | 7/2012 |

OTHER PUBLICATIONS

Japanese Office Action, issued in Japanese Application No. 2018-152680 (7 pages).

* cited by examiner

CURRENT COLLECTOR, ELECTRODE PLATE OF THE SAME AND BATTERY

CROSS-REFERENCE TO RELATED APPLICATIONS

The present application claims priority to Chinese Patent Application No. 201711267487.X, filed on Dec. 5, 2017, the content of which is incorporated herein by reference in its entirety.

TECHNICAL FIELD

The present disclosure relates to the field of battery, and in particular, to a current collector, an electrode plate including the current collector, and a battery.

BACKGROUND

Lithium-ion batteries have been widely used in electric vehicles and consumer products due to their advantages such as high energy density, high output power, long cycle life, and low environmental pollution. However, when the lithium ion batteries are subjected to abnormal conditions such as extrusion, collision, or puncture, they can easily to catch fire or explode, causing serious problems. Therefore, the safety issue of the lithium ion batteries greatly limits the application and popularization of the lithium ion batteries.

A large number of experimental results show that an internal short circuit in a battery is the ultimate cause of safety hazards of the lithium ion batteries. In order to avoid the internal short circuit in the battery, researchers tried to improve the separator structure, battery mechanical structure and so on. Some of these studies have improved the safety performance of the lithium ion batteries by modifying the design of current collectors.

The temperature in the battery may rise when an internal short circuit occurs in the battery due to abnormal conditions such as collision, extrusion, or puncture and on the like. According to a technical solution in the related art, alloy having a low melting point is added into the material of a metal current collector. With increasing of the temperature of the battery, the alloy having low-melting point in the current collector begins to melt, thereby resulting in a broken circuit of an electrode plate and cutting off the current. In this way, the safety of the battery is improved. According to another technical solution in the prior art, a multilayered current collector is adopted, in which both sides of a resin layer are connected with metal layers to form a composite. When the temperature of the battery reaches a melting point of the material of the resin layer, the resin layer of the current collector melts to damage the electrode plate, thereby cutting off the current, and enhancing the safety of the battery.

However, these solutions in the related art cannot effectively prevent the occurrence of the internal short circuit in the lithium ion battery, and cannot guarantee that the battery can continue to operate under the abnormal conditions. In the above solutions, the temperature in the battery would still rise sharply after the internal short circuit occurs in the battery. When the battery temperature rises sharply, danger of varying degrees would still occur if the safety component cannot respond quickly. In these solutions, even the safety component responds and successfully avoids the hazard of the battery, the battery cannot continue to operate.

Therefore, it is necessary to provide a design of a current collector and a battery that can effectively prevent accidents such as firing and explosion caused by the occurrence of the internal short circuit under the abnormal conditions such as collision, extrusion, or puncture, without affecting the normal operation of the battery.

SUMMARY

In view of the above, the present disclosure provides a current collector, an electrode plate including the current collector, and a battery.

In a first aspect, the present disclosure provides a current collector. The current collector includes at least one conductive layer configured to support an electrode active material layer, and an insulation layer configured to support the at least one conductive layer. The at least one conductive layer is located on at least one surface of the insulation layer. Each of the at least one conductive layer has a room temperature film resistance RS satisfying $0.01\Omega/\square \leq RS \leq 0.15\Omega/\square$.

In a second aspect, the present disclosure provides an electrode plate including the current collector according to the first aspect.

In a third aspect, the present disclosure provides a battery including the electrode plate according to the second aspect.

Technical solutions of the present disclosure have at least the following beneficial effects:

The current collector provided by the present disclosure includes an insulation layer with a supporting function and a conductive layer with conduction and current collection function. The conductive layer has a room temperature film resistance RS satisfying: $0.01\Omega/\square \leq R_S \leq 0.15\Omega/\square$. Such current collector can significantly increase a short circuit resistance of the battery when the short circuit occurs under an abnormal condition and significantly reduce the short circuit current, thereby reducing the amount of heat generated during the short circuit and significantly improving safety performance of the battery. In addition, since the amount of the generated heat is relatively small, the heat generated at a position where the short circuit occurs can be totally absorbed by the battery. Therefore, the resulted temperature rise of the battery is small, the damage to the battery caused by the short circuit can be limited to a "point" range, and only a "point break" is formed, without influencing normal operation of the battery in a short time. The conductive layer of the current collector may include a conductive layer body and a protective layer located on at least one surface of the conductive layer body, which can significantly improve operation stability and service life of the current collector.

Moreover, a battery using this current collector can undergo damages for many times, without leading to accidents such as firing or explosion, and can operate normally in a short time. Besides, the current collector with the conductive layer having a room temperature film resistance in the above range has excellent safety performance, and enables the battery to have good electrochemical properties, such as good discharge capacitance and good rate performance.

REFERENCE SIGNS 1-positive electrode plate;
10-positive current collector;
  101-positive insulation layer;
  102-positive conductive layer;
    1021-positive conductive layer body;
    1022-positive protective layer;
11-positive active material layer;
2-negative electrode plate;
20-negative current collector;
  201-negative insulation layer;
  202-negative conductive layer;
    2021-negative conductive layer body;
    2022-negative protective layer;
21-negative active material layer;
3-separator;
4-nail.

DESCRIPTION OF EMBODIMENTS

The present disclosure is described in detail with reference to embodiments of the present disclosure. It should be understood that these embodiments are merely used to illustrate the present disclosure, but not to limit the scope of the present disclosure.

The embodiments of present disclosure provide a current collector. The current collector includes an insulation layer and a conductive layer. The insulation layer is configured to support and protect the conductive layer. The conductive layer is configured to support an electrode active material layer and provide electrons for the electrode active material layer. That is, the conductive layer has functions of conduction and current-collection. The conductive layer is located on at least one surface of the insulation layer.

Figure 1:
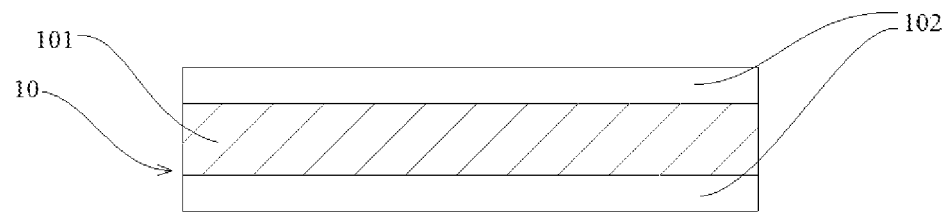
FIG. 1 is a structural schematic diagram of a positive current collector according to an embodiment of the present disclosure.
Figure 2:
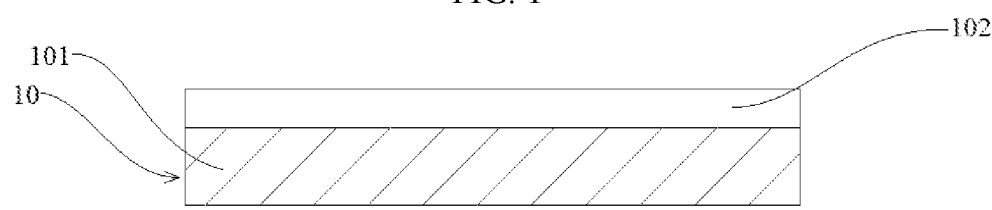
FIG. 2 is a structural schematic diagram of a positive current collector according to another embodiment of the present disclosure.
Figure 3:
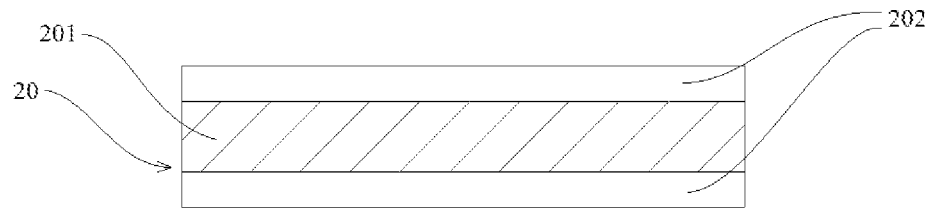
FIG. 3 is a structural schematic diagram of a negative current collector according to an embodiment of the present disclosure.
Figure 4:
FIG. 4 is a structural schematic diagram of a negative current collector according to another embodiment of the present disclosure.

FIGS. 1 and 2 are structural schematic diagrams of positive current collectors according to embodiments of the present disclosure. As shown in FIGS. 1 and 2, the positive current collector 10 includes a positive insulation layer 101 and at least one positive conductive layer 102, for coating a positive active material thereon for preparing a positive electrode plate. FIGS. 3 and 4 are structural schematic diagrams of negative current collectors according to embodiments of the present disclosure. As shown in FIGS. 3 and 4, the negative current collector 20 includes a negative insulation layer 201 and at least one negative conductive layer 202, for coating a negative active material thereon for preparing a negative electrode plate. As shown in FIG. 1 and FIG. 3, the conductive layer can be provided on each of two opposite surfaces of the insulation layer. Alternatively, as shown in FIGS. 2 and 4, the conductive layer is provided on only one surface of the insulation layer.

Structures and performances of the current collector provided by the embodiments of the present disclosure are described below in detail.

Conductive Layer

In the current collector provided by the embodiments of the present disclosure, the conductive layer has a room temperature film resistance $R_S$, and $0.01\,\Omega/\square \leq R_S \leq 0.15\,\Omega/\square$.

The film resistance of the conductive layer is calculated as ohm per square ($\Omega/\square$), where the conductive layer is considered as a two-dimensional system of a two-dimensional body, equivalent to the concept of resistivity used for a three-dimensional system. When talk about the concept of film resistance, it is theoretically assumed that the current flows along the plane of the film.

A resistance of a conventional three-dimensional conductor is calculated as:

$$R = \rho \frac{L}{A}$$

in which ρ represents resistivity, A represents cross-section area, and L represents length. The cross-section area can be factorized into a width W and a film thickness t, thus the resistance can be represented as:

$$R = \frac{\rho}{t}\frac{L}{W} = R_s \frac{L}{W}$$

in which, $R_S$ is the film resistance. When the film is square, i.e., L=W, a measured resistance R is same as the film resistance $R_S$ of the film. $R_S$ is not subjected to a magnitude of L or W, and $R_S$ is a resistance of one unit square. Therefore, a unit of $R_S$ can be represented by ohm per square (Ω/□).

The room temperature film resistance mentioned in the embodiments of the present disclosure refers to a resistance of the conductive layer measured by means of a four-probe manner at room temperature, and the room temperature is a temperature in a range of 15-25° C.

In an existing lithium ion battery, when an internal short circuit occurs in the battery under abnormal conditions, a large current will be instantaneously generated, and a large amount of short circuit heat will be generated at the same time. The heat generally initiates an aluminothermal reaction at the positive current collector made of aluminum foil, which further causes firing, explosion, etc. of the battery. In the embodiments of the present disclosure, the problems above are solved by increasing the room temperature film resistance $R_S$ of the current collector.

The internal resistance of the battery generally includes ohmic internal resistance of the battery and internal resistance of the battery polarization. The resistance of the active material, the resistance of the current collector, the interfacial resistance, the composition of the electrolyte and the like, all have significant influence on the internal resistance of the battery.

When an internal short circuit occurs under an abnormal condition, the internal resistance of the battery will be reduced significantly due to the internal short circuit. Therefore, increase of the resistance of the current collector can increase an internal resistance of the battery due to the occurrence of the short circuit of the battery, thereby improving safety performance of the battery. In the embodiments of the present disclosure, the influence of a short circuit damage on the battery can be limited within a "point" range, i.e., the influence of a short circuit damage on the battery can be limited to a damaged point. In addition, the high resistance of the current collector further reduces the short circuit current significantly, and temperature rise caused by heat generated during the short circuit is not significant and will not influence normal operation of the battery in a short time. Such characteristic is called "point break".

When the room temperature film resistance $R_S$ of the conductive layer satisfies: 0.01Ω/□≤$R_S$≤0.15Ω/□, the short circuit current can be significantly reduced when the internal short circuit occurs in the battery, and thus heats generated by the short circuit can be significantly reduced, thereby significantly improving safety performance of the battery. Besides, the amount of heat generated by the short circuit can be controlled within a range that can be completely absorbed by the battery, and only can results in an insignificant increase in temperature, so that the influence caused by the short circuit damage on the battery is limited within a "point" range, i.e., merely forming "point break", without affecting the normal operation of the battery in a short time.

In an embodiment, the room temperature film resistance $R_S$ of the conductive layer satisfies 0.02Ω/□≤$R_S$≤0.1 Ω/□.

If the room temperature film resistance $R_S$ of the conductive layer was too high, the functions of conduction and current collection of the conductive layer would be influenced such that electrons cannot be effectively transmitted in the current collector, the electrode active material layer, and the interface therebetween, i.e., polarization of the electrode active material layer on the surface of the conductive layer will be increased, which would negatively affect electrochemical performance of the battery, such as discharge capacitance, rate performance, etc. Therefore, the room temperature film resistance $R_S$ of the conductive layer is set to satisfy 0.01Ω/□≤$R_S$≤0.15 Ω/□.

In the present disclosure, an upper limit of the room temperature film resistance $R_S$ can be 0.15 Ω/□, 0.12 Ω/□, 0.1 Ω/□, 0.09 Ω/□, 0.08 Ω/□, 0.07Ω/□, or 0.05Ω/□. A lower limit of the room temperature film resistance $R_S$ can be 0.01 Ω/□, 0.02 Ω/□, 0.025 Ω/□, 0.03Ω/□, or 0.04Ω/□. A range of the room temperature film resistance $R_S$ can be formed by combing any of the upper limits and any of the lower limits.

Besides, a thickness of the conductive layer also has a great influence on the operation reliability and service life of the current collector.

Preferably, in the current collector of the embodiments of the present disclosure, the conductive layer has a thickness of D2 satisfying 300 nm ≤ D2 ≤ 2 μm. If the conductive layer is too thin, the room temperature film resistance $R_S$ of the current collector can be increased, but the electrode plate would be easily damaged during manufacturing processes. If the conductive layer is too thick, an energy density of the battery would be negatively influenced and it is disadvantageous to the increase of the room temperature film resistance $R_S$ of the conductive layer.

An upper limit of the thickness D2 of the conductive layer can be 2 μm, 1.8 μm, 1.5 μm, 1.2 μm, 1 μm, 900 nm, 800 nm, 700 nm, 600 nm, or 500 nm. A lower limit of the thickness D2 of the conductive layer can be 300 nm, 350 nm, 400 nm, or 450 nm. The thickness D2 of the conductive layer can be in a range consisting of any one upper limit and any one lower limit, preferably, 500 nm≤D2≤1.5 μm.

Optionally, the conductive layer is made of a material selected from a group consisting of a metallic conductive material, a carbon-based conductive material, or combinations thereof. The metallic conductive material is preferably selected from a group consisting of aluminum, copper, nickel, titanium, silver, nickel-copper alloy, aluminum-zirconium alloy, or combinations thereof. The carbon-based conductive material is preferably selected from a group consisting of graphite, acetylene black, graphene, carbon nanotube, or combinations thereof.

The conductive layer can be formed on the insulation layer by means of at least one of mechanical rolling, bonding, vapor deposition, and electroless plating. With respect to the vapor deposition, physical vapor deposition (PVD) is preferable. The physical vapor deposition is preferably at least one of evaporation deposition and sputtering deposition. As regards the evaporation deposition, at least one of vacuum evaporation, thermal evaporation deposition, electron beam evaporation method (EBEM) is preferable. As regards the sputtering deposition, magnetron sputtering is preferable.

Further, the conductive layer of the current collector according to the embodiments of the present disclosure can include a conductive layer body and a protective layer located on at least one surface of the conductive layer body. The protective layer can protect the conductive layer body from being oxidized, corroded or damaged, and thus significantly improve operation stability and service life of the current collector.

FIGS. 5 to 12 are structural schematic diagrams of the current collectors provided with the protective layer according to the embodiments of the present disclosure. The positive current collectors are shown in FIGS. 5-10.

Figure 5:
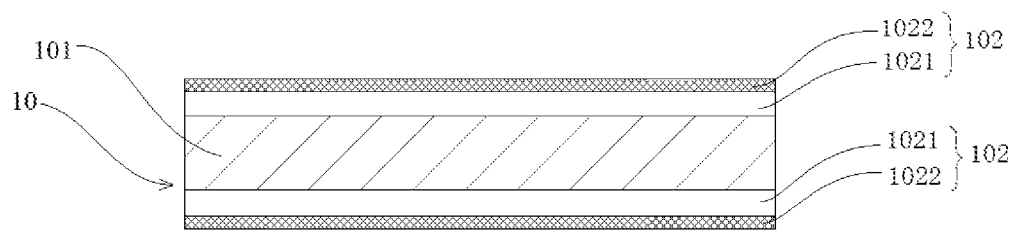
FIG. 5 is a structural schematic diagram of a positive current collector according to still another embodiment of the present disclosure.

In FIG. 5, the positive current collector 10 includes a positive insulation layer 101 and two positive conductive layers 102 respectively arranged on two opposite surfaces of the positive insulation layer 101. Each of the two positive conductive layers 102 includes a positive conductive layer body 1021 and a positive protective layer 1022 arranged on a surface of the positive conductive layer body 1021 away from the positive insulation layer 101 (i.e., on an upper surface of the positive conductive layer body 1021).

Figure 6:
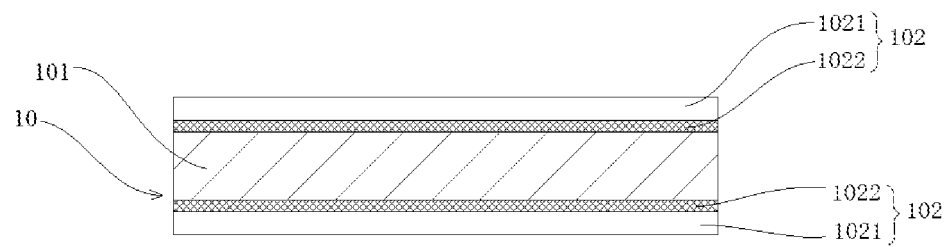
FIG. 6 is a structural schematic diagram of a positive current collector according to still another embodiment of the present disclosure.

In FIG. 6, the positive current collector 10 includes a positive insulation layer 101 and two positive conductive layers 102 respectively arranged above two opposite surfaces of the positive insulation layer 101. Each of the two positive conductive layers 102 includes a positive conductive layer body 1021 and a positive protective layer 1022 arranged on a surface of the positive conductive layer body 1021 facing the positive insulation layer 101 (i.e., on a lower surface of the positive conductive layer body 1021).

Figure 7:
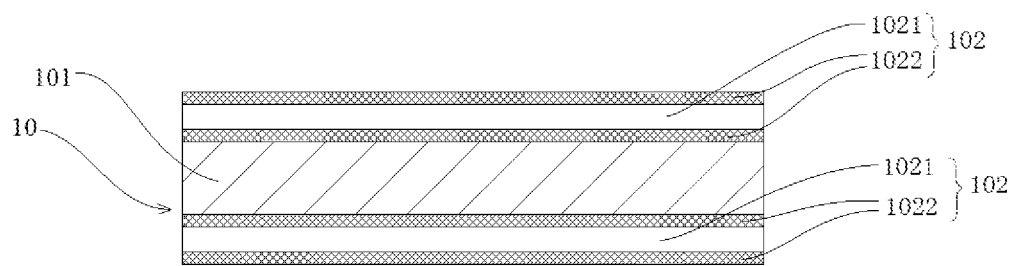
FIG. 7 is a structural schematic diagram of a positive current collector according to still another embodiment of the present disclosure.

In FIG. 7, the positive current collector 10 includes a positive insulation layer 101 and two positive conductive layers 102 respectively arranged above two opposite surfaces of the positive insulation layer 101. Each of the positive conductive layers 102 includes a positive conductive layer body 1021 and two positive protective layers 1022 respectively arranged on two opposite surfaces of the positive conductive layer body 1021 (i.e., respectively on an upper surface and a lower surface of the positive conductive layer body 1021).

Figure 8:
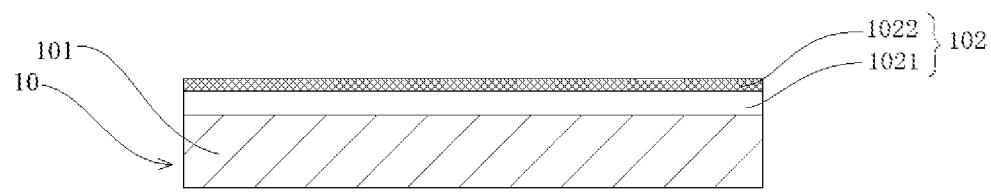
FIG. 8 is a structural schematic diagram of a positive current collector according to still another embodiment of the present disclosure.

In FIG. 8, the positive current collector 10 includes a positive insulation layer 101 and a positive conductive layer 102 arranged on one surface of the positive insulation layer 101. The positive conductive layer 102 includes a positive conductive layer body 1021 and a positive protective layer 1022 arranged on a surface of the positive conductive layer body 1021 away from the positive insulation layer 101 (i.e., on an upper surface of the positive conductive layer body 1021).

Figure 9:
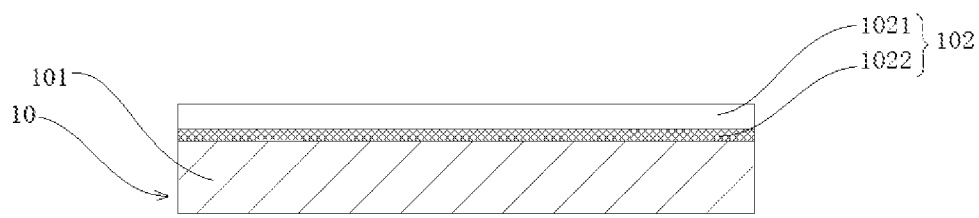
FIG. 9 is a structural schematic diagram of a positive current collector according to still another embodiment of the present disclosure.

In FIG. 9, the positive current collector 10 includes a positive insulation layer 101 and a positive conductive layer 102 arranged above one surface of the positive insulation layer 101. The positive conductive layer 102 includes a positive conductive layer body 1021 and a positive protective layer 1022 arranged on a surface of the positive conductive layer body 1021 facing the positive insulation layer 101 (i.e., on a lower surface of the positive conductive layer body 1021).

Figure 10:
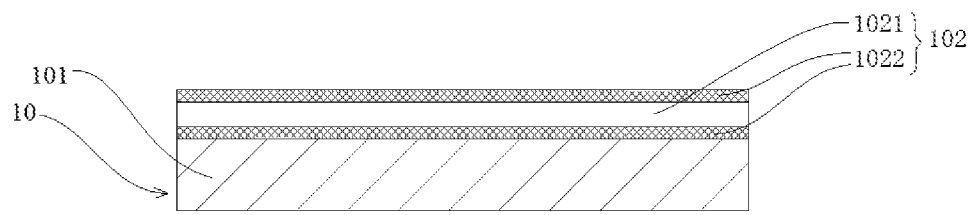
FIG. 10 is a structural schematic diagram of a negative current collector according to still another embodiment of the present disclosure.

In FIG. 10, the positive current collector 10 includes a positive insulation layer 101 and a positive conductive layer 102 arranged above one surface of the positive insulation layer. The positive conductive layer 102 includes a positive conductive layer body 1021 and two positive protective layers 1022 respectively arranged on two opposite surfaces of the positive conductive layer body 1021 (i.e., on an upper surface and a lower surface of the positive conductive layer body 1021).

Similarly, the negative current collectors are shown in FIGS. 11-16.

Figure 11:
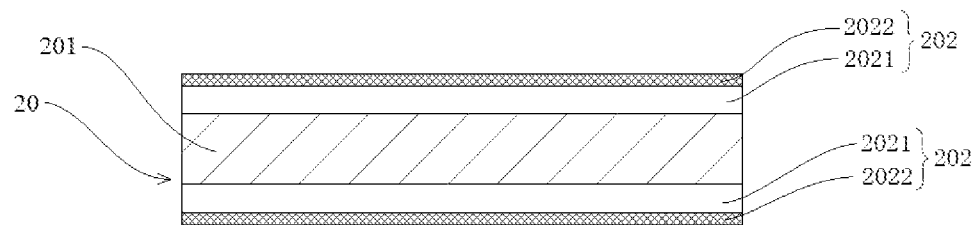
FIG. 11 is a structural schematic diagram of a negative current collector according to still another embodiment of the present disclosure.

In FIG. 11, the negative current collector 20 includes a negative insulation layer 201 and two negative conductive layers 202 respectively arranged on two opposite surfaces of the negative insulation layer 201. Each negative conductive layer 202 includes a negative conductive layer body 2021 and a negative protective layer 2022 arranged on a surface of the negative conductive layer body 2021 away from the negative insulation layer 201 (i.e., on an upper surface of the negative conductive layer body 2021).

Figure 12:
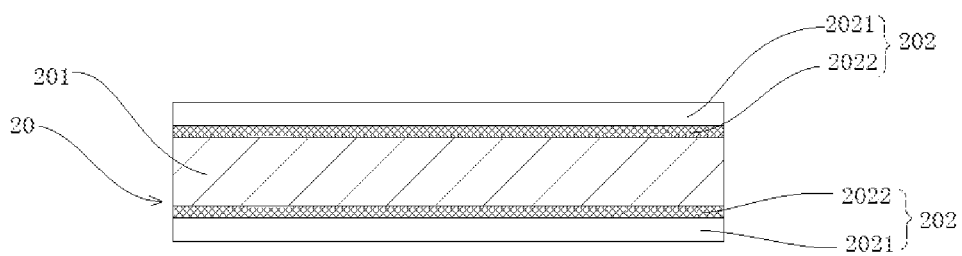
FIG. 12 is a structural schematic diagram of a negative current collector according to still another embodiment of the present disclosure.

In FIG. 12, the negative current collector 20 includes a negative insulation layer 201 and two negative conductive layers 202 respectively arranged above two opposite surfaces of the negative insulation layer 201. Each negative conductive layer 202 includes a negative conductive layer body 2021 and a negative protective layer 2022 arranged on a surface of the negative conductive layer body 2021 facing the negative insulation layer 201 (i.e., on a lower surface of the negative conductive layer body 2021).

Figure 13:
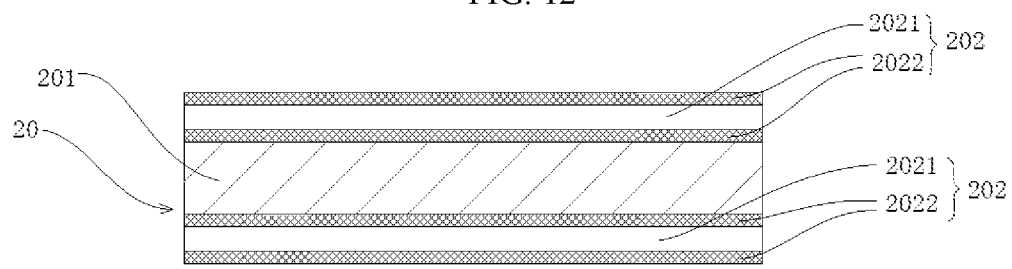
FIG. 13 is a structural schematic diagram of a negative current collector according to still another embodiment of the present disclosure.

In FIG. 13, the negative current collector 20 includes a negative insulation layer 201 and two negative conductive layers 202 respectively arranged above two opposite surfaces of the negative insulation layer 201. Each negative conductive layer 202 includes a negative conductive layer body 2021 and two negative protective layers 2022 respectively arranged on two opposite surfaces of the negative conductive layer body 2021 (i.e., on an upper surface and a lower surface of the negative conductive layer body 2021).

Figure 14:
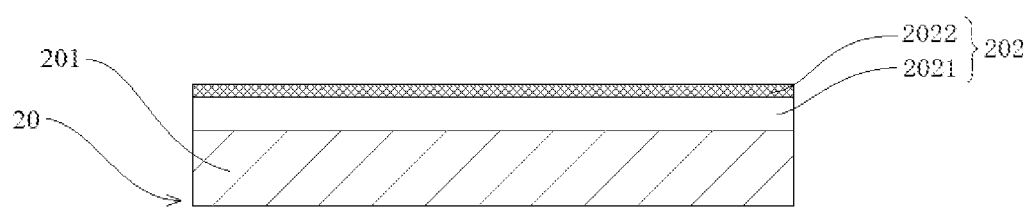
FIG. 14 is a structural schematic diagram of a negative current collector according to still another embodiment of the present disclosure.

In FIG. 14, the negative current collector 20 includes a negative insulation layer 201 and a negative conductive layer 202 arranged on one surface of the negative insulation layer 201. The negative conductive layer 202 includes a negative conductive layer body 2021 and a negative protective layer 2022 arranged on a surface of the negative conductive layer body 2021 away from the negative insulation layer 201 (i.e., on an upper surface of the negative conductive layer body 2021).

Figure 15:
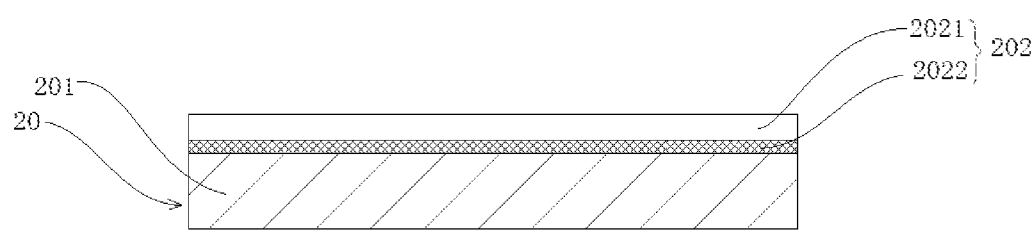
FIG. 15 is a structural schematic diagram of a negative current collector according to still another embodiment of the present disclosure.

In FIG. 15, the negative current collector 20 includes a negative insulation layer 201 and a negative conductive layer 202 arranged above one surface of the negative insulation layer 201. The negative conductive layer 202 includes a negative conductive layer body 2021 and a negative protective layer 2022 arranged on a surface of the negative conductive layer body 2021 facing the negative insulation layer 201 (i.e., on a lower surface of the negative conductive layer body 2021).

Figure 16:
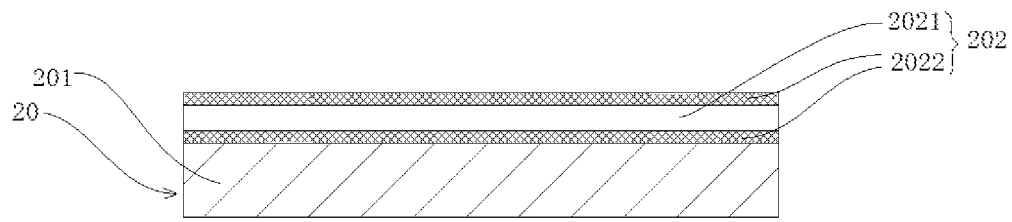
FIG. 16 is a structural schematic diagram of a negative current collector according to still another embodiment of the present disclosure.

In FIG. 16, the negative current collector 20 includes a negative insulation layer 201 and a negative conductive layer 202 arranged above one surface of the negative insulation layer 201. The negative conductive layer 202 includes a negative conductive layer body 2021 and two negative protective layers 2022 respectively arranged on two opposite surfaces of the negative conductive layer body 2021 (i.e., on an upper surface and a lower surface of the negative conductive layer body 2021).

In an embodiment, the protective layer is located on a lower surface of the conductive layer body, i.e., between the conductive layer body and the insulation layer. The protective layer at such a position can not only protect the conductive layer body and thus improve service life and operation reliability of the current collector, but also has the following advantages: (1) compared with the protective layer located on the upper surface of the conductive layer body, the protective layer located on the lower surface of the conductive layer body has stronger adhesion to the conductive layer body and thus can better protect the conductive layer body; (2) the protective layer located on the lower surface of the conductive layer body can better enhance mechanical strength of the current collector; (3) the protective layer located on the lower surface of the conductive layer body can form a complete support structure to protect the conductive layer body.

In an embodiment, the protective layer is located on each of the two opposite surfaces of the conductive layer body, i.e., on the upper surface and the lower surface of the conductive layer body, so as to improve the operation stability and service life of the current collector to the greatest extent, and improve the performances of the battery, such as capacitance retention rate and cycle life.

The conductive layer body is made of a material selected from a group consisting of a metallic conductive material, carbon-based conductive material, or combinations thereof. The metallic conductive material can be selected from a group consisting of aluminum, copper, nickel, titanium, silver, nickel copper alloy, aluminum zirconium alloy, or combinations thereof.

The carbon-based conductive material can be selected from a group consisting of graphite, acetylene black, graphene, carbon nanotube, or combinations thereof.

The protective layer can be made of a material selected from a group consisting of metal, metal oxide, conductive carbon, or combinations thereof. Optionally, the metal is selected from a group consisting of nickel, chromium, nickel-based alloy (e.g., nickel chromium alloy), copper-based alloy (e.g., copper nickel alloy), or combinations thereof. Optionally, the metal oxide is selected from a group consisting of aluminum oxide, cobalt oxide, chromium oxide, nickel oxide, or combinations thereof. Optionally, the conductive carbon is selected from a group consisting of conductive carbon black, carbon nanotube, acetylene black, graphene, or combinations thereof.

The nickel-based alloy is an alloy made of pure nickel as a base body and adding one or more other elements. The nickel-chromium alloy is preferred. The nickel-chromium alloy is an alloy made of metal nickel and metal chromium, and a mole ratio of nickel element to chromium element is from 1:99 to 99:1.

The copper-based alloy is an alloy made of pure copper as a base body and adding one or more other elements. The copper-nickel alloy is preferred. Optionally, in the copper-nickel alloy, a mole ratio of nickel element to copper element is from 1:99 to 99:1.

The protective layers located on the two opposite surfaces of the conductive layer body can be made of a same material or different materials, and can have a same thickness or different thicknesses.

The protective layer has a thickness D3. When D3 ≤ 1/10 D2, the influence of the protective layer on the room temperature film resistance of the conductive layer can be omitted.

As a further improvement of the current collector, the thickness D3 of the protective layer satisfies D3 ≤ 1/10 D2 and 1 nm ≤ D3 ≤ 200 nm. That is, the thickness the protective layer is smaller than or equal to 1/10 of the thickness D2 of the conductive layer and is within a range of 1 nm-200 nm. An upper limit of the thickness D3 of the protective layer can be 200 nm, 180 nm, 150 nm, 120 nm, 100 nm, 80 nm, 60 nm, 55 nm, 50 nm, 45 nm, 40 nm, 30 nm, or 20 nm. A lower limit of the thickness D3 of the protective layer can be 1 nm, 2 nm, 5 nm, 8 nm, 10 nm, 12 nm, 15 nm, or 18 nm. The thickness D3 of the protective layer can be in a range consisting of any one upper limit and any one lower limit. If the protective layer is too thin, it could not protect the conductive layer; and if the protective layer is too thick, a weight energy density and a volume energy density of the battery would be reduced. Preferably, 10 nm ≤ D3 ≤ 50 nm.

As regards a ratio of the thickness of the protective layer to the entire thickness of the conductive layer, it is preferable that D3 satisfies: 1/2000 D2 ≤ D3 ≤ 1/10 D2. That is, the thickness D3 is 1/2000-1/10 of the thickness D2. More preferably, D3 satisfies: 1/1000 D2 ≤ D3 ≤ 1/10 D2.

The protective layer can be deposited on the conductive layer body by means of vapor deposition, an in-situ formation method, a coating method, or the like. With respect to the vapor deposition, physical vapor deposition (PVD) is preferable. The physical vapor deposition is preferably at least one of evaporation or sputtering deposition. The evaporation is preferably at least one of vacuum evaporating, thermal evaporation deposition, or electron beam evaporation method (EBEM). As regards the sputtering deposition, magnetron sputtering is preferable. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

Insulation Layer

In the current collector of the embodiments of the present disclosure, the insulation layer is mainly used to support and protect the conductive layer. The insulation layer has a thickness of D1, and D1 satisfies 1 μm ≤ D1 ≤ 20 μm. If the insulation layer is too thin, it is likely to be broken during the processing process of the electrode plate or the like. If the insulation layer is too thick, a volumetric energy density of a battery adopting the current collector can be reduced.

An upper limit of the thickness D1 of the insulation layer can be 20 μm, 15 μm, 12 μm, 10 μm, or 8 μm. A lower limit of the thickness D1 of the conductive layer can be 1 μm, 1.5 μm, 2 μm, 3 μm, 4 μm, 5 μm, 6 μm, or 7 μm. The thickness of D1 of the insulation layer can be in a range consisting of any one upper limit and any one lower limit. Preferably, 2 μm ≤ D1 ≤ 10 μm, more preferably 2 μm ≤ D1 ≤ 6 μm.

Optionally, the insulation layer is made of a material selected from a group consisting of an organic polymer insulation material, an inorganic insulation material, a composite material, or combinations thereof. Preferably, the composite material is composed of the organic polymer insulation material and the inorganic insulation material.

The organic polymer insulation material is selected from a group consisting of polyamide (abbreviated as PA), polyethylene terephthalate (abbreviated as PET), polyimide (abbreviated as PI), polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, poly polyformaldehyde (abbreviated as POM), phenol-formaldehyde resin, ethylene propylene rubber (abbreviated as PPE), polytetrafluoroethylene (abbreviated as PTFE), silicone rubber, polyvinylidene fluoride (abbreviated as PVDF), polycarbonate (abbreviated as PC), or combinations thereof.

The inorganic insulation material is selected from a group consisting of aluminum oxide ($Al_2O_3$), silicon carbide (SiC), silicon dioxide ($SiO_2$), or combinations thereof.

The composite material is preferably selected from a group consisting of epoxy resin glass fiber reinforced composite material, polyester resin glass fiber reinforced composite material, or combinations thereof.

Since the insulation layer generally has a smaller density than that of metal, the current collector according to the present disclosure can improve safety performance of the battery while improving the weight energy density of the battery. Moreover, since the insulation layer can well support and protect the conductive layer located on its surface, a breakage of the electrode, which is common in the conventional current collector, is unlikely to occur.

A second aspect of the present disclosure provides an electrode plate. The electrode plate includes the current collector according to the first aspect of the present disclosure and at least one electrode active material layer formed on at least one surface of the current collector.

Figure 17:
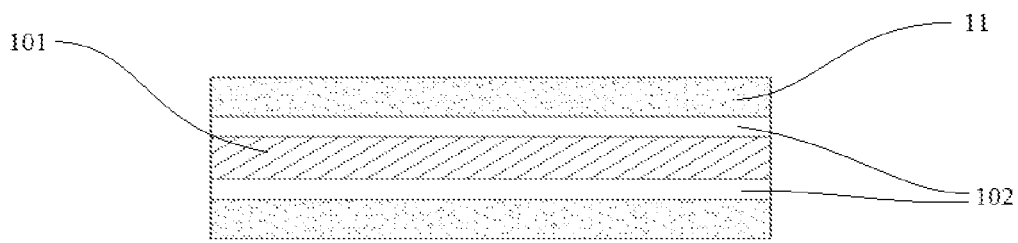
FIG. 17 is a structural schematic diagram of a positive electrode plate according to an embodiment of the present disclosure.
Figure 18:
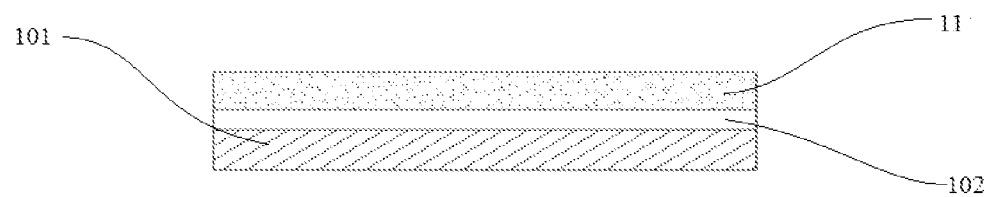
FIG. 18 is a structural schematic diagram of a positive electrode plate according to another embodiment of the present disclosure.

FIGS. 17 and 18 are structural schematic diagrams of positive electrode plates provided by the embodiments of the present disclosure. As shown in FIGS. 17 and 18, the positive electrode plate 1 includes the positive current collector 10 according to the present disclosure and at least one positive active material layer 11 formed on at least one surface of the positive current collector 10. The positive current collector 10 includes a positive insulation layer 101 and at least one positive conductive layer 102.

Figure 19:
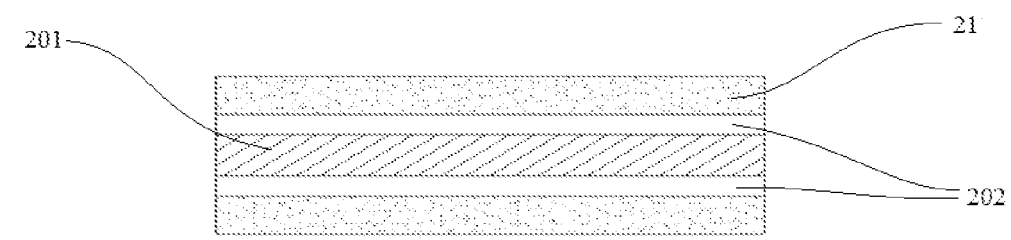
FIG. 19 is a structural schematic diagram of a negative electrode plate according to an embodiment of the present disclosure.
Figure 20:
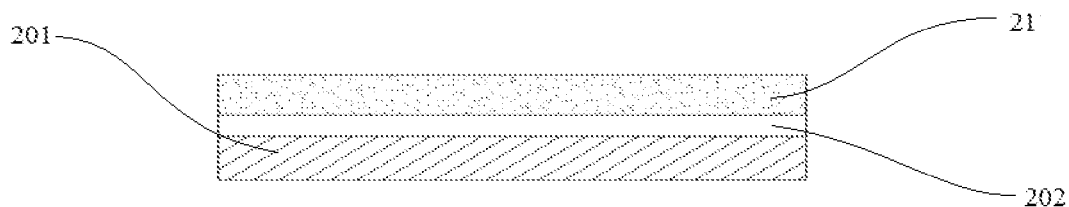
FIG. 20 is a structural schematic diagram of a negative electrode plate according to another embodiment of the present disclosure.

FIGS. 19 and 20 are structural schematic diagrams of negative electrode plates provided by the embodiments of the present disclosure. As shown in FIGS. 19 and 20, the negative electrode plate 2 includes the negative current collector 20 according to the present disclosure and at least one negative active material layer 21 formed on at least one surface of the negative current collector 20. The negative current collector 20 includes a negative insulation layer 201 and at least one negative conductive layer 202.

When the conductive layer is arranged on each surface of the insulation layer and an active material is coated on each surface of the current collector, the prepared positive electrode plate and negative electrode plate are shown in FIG. 17 and FIG. 19, respectively, and can be used directly in a battery. When the conductive layer is only provided on one surface of the insulation layer and the active material is coated on one surface of the current collector, the prepared positive electrode plate and negative electrode plate are shown in FIG. 18 and FIG. 20, respectively, and can be used in a battery after being folded.

A third aspect of the present disclosure provides a battery. The battery includes a positive electrode plate, a separator, a negative electrode plate, and an electrolyte.

The positive electrode plate and/or the negative electrode plate are the electrode plate according to the above embodiments of the present disclosure. The battery according to the present disclosure can be a wound type or laminated type. The battery according to the present disclosure can be one of lithium-ion secondary battery, lithium-ion primary battery, a sodium-ion secondary battery, or a magnesium-ion battery, but not limited these.

The embodiments of the present disclosure further provide a battery including a positive electrode plate, a separator, a negative electrode plate, and an electrolyte. Only the positive electrode plate of this battery is the positive electrode plate according to the above embodiments above.

Preferably, the positive electrode plate of the battery according to the present disclosure adopts the electrode plate provided by the present disclosure. A conventional positive current collector has high aluminum content, and when the shirt circuit occurs under the abnormal condition of the battery, the heat generated at the short circuit point may initiate an severe aluminothermal reaction such that a large amount of heat is generated and accidents such as explosion may occur to the battery. Therefore, when the positive electrode plate of the battery adopts the electrode plate of the present disclosure, the aluminothermal reaction can be avoided due the greatly reduced aluminum content in the positive current collector, thereby significantly improving the safety performance of the battery.

Figure 21:
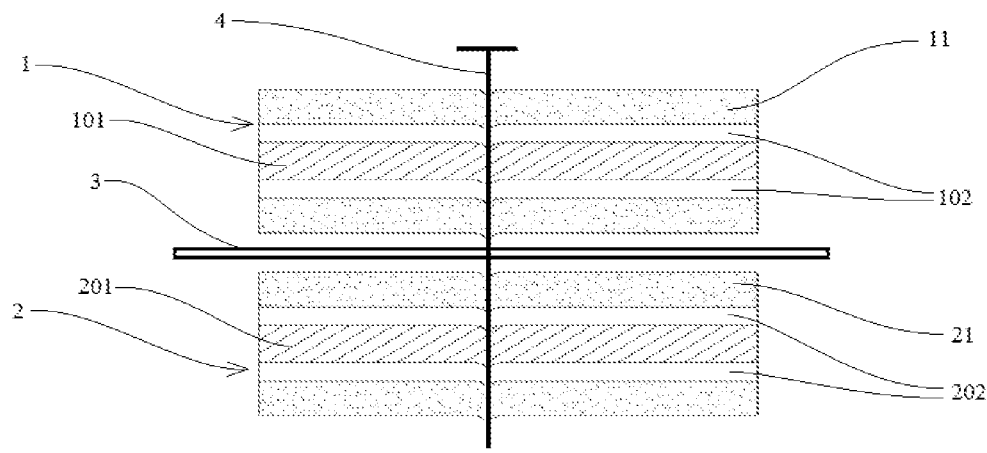
FIG. 21 is a schematic diagram of one-time nailing experiment according to the present disclosure.

In the present disclosure, the abnormal conditions of the battery are simulated by a nailing experiment and the change of the battery after nailing is observed. FIG. 21 is a schematic diagram of a nailing experiment of a battery. For conciseness, this figure only shows that a nail 4 punctures one layer of positive electrode plate 1, one layer of separator 3, and one layer of negative electrode plate 2. It should be noted that in the actual nailing experiment, the nail 4 penetrates the whole battery, which generally includes multiple layers of positive electrode plates 1, multiple layers of separators 3, and multiple layers of negative electrode plates 2. It can be seen from FIG. 21 that, when a short circuit occurs in the battery due to nailing, the short circuit current is significantly reduced and the heat generated during the short circuit is controlled within a range that can be completely absorbed by the battery. Therefore, the heat generated at a position where the internal short circuit occurs can be completely absorbed by the battery, and the increase in temperature is also very small, so that the damage on the battery caused by the short circuit can be limited to the nailing position and forms a "point break", without influencing normal operation of the battery in a short circuit.

Besides, upon a large number of experiments, it was found in the present disclosure that the larger the capacitance of the battery is, the lower the internal resistance of the battery is, and the poorer the safety performance of the battery is. That is, the capacitance of the battery (Cap) is inversely proportional to the internal resistance of the battery (r):

$$r = A/\text{Cap}$$

in which, r represents the internal resistance of the battery, Cap represents the capacitance of the battery, and A represents a coefficient.

The capacitance of the battery Cap is a theoretical capacitance of the battery, and generally is a theoretical capacitance of the positive electrode plate of the battery.

r can be measured by an internal resistance instrument.

As for a conventional lithium ion secondary battery formed by a conventional positive electrode plate and a conventional negative electrode plate, fuming, firing, explosion, or the like of different degrees may occurs in substantially all of the conventional lithium ion secondary batteries when a short circuit occurs under abnormal conditions.

At a same capacitance, the battery according to the embodiments of the present disclosure has a relatively greater internal resistance, and thus has a greater value of A.

As for the battery according to the embodiments of the present disclosure, when the coefficient A satisfies 25 Ah·mΩ ≤ A ≤ 400 Ah·mΩ, the battery can have good electrochemical performance as well as good safety performance.

If the coefficient A is too great, the battery has excessively high internal resistance such that the electrochemical performance deteriorates and the battery is not applicable.

If the coefficient A is too small, temperature of the battery would rise too high in case of the internal short circuit such that the safety performance of the battery is reduced.

Preferably, the coefficient A satisfies 30 Ah·mΩ ≤ A ≤ 200 Ah·mΩ. More preferably, the coefficient A satisfies 40 Ah·mΩ ≤ A ≤ 150 Ah·mΩ.

The present disclosure further provides a usage of the current collector in preparing a battery which merely forms point break for self-protection in case of short circuit caused by an abnormal condition. In the present disclosure, the influence of the short circuit damage on the battery to be limited to a "point range" without influencing normal operation of the battery in a short time, which is also referred as "point break".

The present disclosure further provides a usage of the current collector in a current collector of a battery which merely forms point break for self-protection in case of short circuit caused by an abnormal condition.

Preferably, the abnormal condition includes collision, squeezing, puncturing by foreign objects, etc. In the event of these damages, the short circuit is always induced by a conductive material connecting the positive electrode and the negative electrode. These abnormal conditions are uniformly called nailing. The abnormal condition of the battery is simulated by a nailing experiment in the specific embodiments of the present disclosure.

Embodiments

1. Preparation of Current Collector:

An insulation layer having a certain thickness was selected, the conductive layer having a certain thickness was formed on a surface of the insulation layer by means of vacuum evaporation, mechanical rolling or bonding, and a room temperature film resistance of the conductive layer was measured.

(1) The conditions of the vacuum evaporation: the insulation was placed in a vacuum chamber after a surface cleaning treatment, a high-purity meal wire in a metal evaporation chamber was melt and evaporated at a high temperature of from 1600° C. to 2000° C., the evaporated metal passed through a cooling system in the vacuum chamber and was finally deposited on a surface of the insulation layer to form the conductive layer.

(2) The conditions of mechanical rolling: a foil of a material used for forming the conductive layer was placed in a mechanical roller, and rolled to a predetermined thickness by applying a pressure in a range of 20t-40t, then was placed on a surface of a surface of the insulation layer that has been subjected to a surface cleaning treatment, and finally were placed in the mechanical roller, so as to be tightly bonded by applying a pressure in a range of 30t-50t.

(3) The conditions of bonding: a foil of a material used for forming the conductive layer was placed in a mechanical roller, and was rolled to a predetermined thickness by applying a pressure in a range of 20t-40t; then, a mixed solution consisting of PVDF and NMP was applied on a surface of a surface cleaned insulation layer; and finally the conductive layer having a predetermined thickness was bonded to the surface of the insulation layer and was dried at 100° C.

(4) Method for measuring the room temperature film resistance: RTS-9 dual electrically measuring four probe tester was used under measuring conditions: room temperature 23±2° C., relative humidity 65%. During the measurement, the material to be measured was subjected to a surface cleaning, and then was placed horizontally on a measuring table, the four probes were loaded down to contact the surface of the material to be measured, then the automatic measuring mode was adjust to determine a current range of the material, the sheet resistance of the material was measured within a suitable current range, and 8-10 data points of a same sample were collected for measurement precision and error analysis.

Parameters of current collectors and electrode plate using the current collectors according to the Embodiments of the present disclosure and Comparative Examples are listed in Table 1.

2. Preparation of Current Collector Having Protective Layer:

The current collector having the protective layer was prepared in the following manners:

(1) A protective layer was firstly formed on a surface of the insulation layer by means of vapor deposition or coating, then a conductive layer having a certain thickness was formed on the protective layer disposed on the insulation layer by means of vacuum evaporation, mechanical rolling or bonding, so as to prepare a current collector including the protective layer located between the insulation layer and conductive layer. In addition, alternatively, on the basis of the above, an upper protective layer was further formed on a surface of the conductive layer facing away from the insulation layer by means of vapor deposition, in-situ formation, or coating, so as to prepare a current collector including upper and lower protective layers, which are located on two opposite surface of the conductive layer.

(2) A protective layer was firstly formed on a surface of a conductive layer by means of vapor deposition, in-situ formation, or coating, then the above conductive layer provided with the protective layer was mechanically rolled or bonded to a surface of an insulation layer and the protective layer was located between the insulation layer and conductive layer, so as to prepare a current collector including the protective layer located between the insulation layer and conductive layer. In addition, alternatively, on the basis of the above, a protective layer was further formed on a surface of the conductive layer facing away from the insulation layer by means of vapor deposition, n-situ formation, or coating, so as to prepare a current collector including upper and lower protective layers, which were located on two opposite surface of the conductive layer.

(3) A protective layer was firstly formed on a surface of a conductive layer by means of vapor deposition, in-situ formation, or coating, then the above conductive layer provided with the protective layer was mechanically rolled or bonded to a surface of an insulation layer and the protective layer was located on a surface of the conductive layer facing away from the insulation layer.

(4) A protective layers were firstly formed on the two surfaces of a conductive layer by means of vapor deposition, in-situ formation, or coating, then the above conductive layer provided with the protective layers was mechanically rolled or bonded to a surface of an insulation layer and the protective layers were located on the two opposite surfaces of the conductive layer.

(5) Based on "Preparation of The Current Collector" described above, another protective layer was then formed on a surface of the conductive layer body facing away from the insulation layer by vapor deposition, in-situ formation or coating, so as to prepare the current collector having the protective layer, which was located on a surface of the conductive layer body facing away from the insulation layer.

In the embodiments of preparation, the vapor deposition is vacuum evaporation, the in-situ formation is in-situ passivation, and the coating is blade coating.

The conditions of vacuum evaporation: a sample was placed in a vacuum chamber after a surface cleaning treatment, a material for forming the protective layer in an evaporation chamber was melted and evaporated under a high temperature of 1600° C.-2000° C., the evaporated material for forming the protective layer passed through a cooling system in the vacuum chamber and was finally deposited on a surface of the sample to form the protective layer.

The conditions of in-situ passivation: the conductive layer body was placed in a high temperature oxidizing environment at a temperature controlled at 160° C.-250° C., while maintaining the oxygen supply in the high-temperature environment, and the processing time is 30 min, so as to form the protective layer of metal oxide.

The conditions of gravure coating: a material for forming the protective layer and NMP were mixed together to form a slurry (solid material content: 20%-75%), then the slurry of the above-mentioned material of the protective layer was coated onto a surface of the sample, and the thickness of the coating was controlled by a gravure roller, and finally the sample with the coated slurry was dried under 100° C.-130° C.

Specific Parameters of prepared current collectors having the protective layer(s) and electrode plates using the current collectors are listed in Table 2.

3. Preparation of Electrode Plate:

Slurry of positive electrode or negative electrode was coated on a surface of the current collector by a conventional coating process of battery, then dried at 100° C. to obtain the positive electrode plate or the negative electrode plate.

Conventional positive electrode plate: the current collector is an aluminum foil having a thickness of 12 μm, and the electrode active material layer is a layer of ternary material (NCM) having a certain thickness.

Conventional negative electrode plate: the current collector is a cooper foil having a thickness of 8 μm, and the electrode active material layer is a layer of graphite having a certain thickness.

The current collectors of Electrode Plate 1 # to 10 # in Table 1 have no protective layer. In Table 2, the electrode plates are provided with the protective layer, "Electrode Plate 3-1 #" represents an electrode plate having the same conductive layer body as Electrode Plate 3 #, and so on. "Electrode plate 6-4 #" represents an electrode plate having the same as Electrode Plate 6 #, and so on.

4. Preparation of Battery:

According to a conventional battery preparing process, a positive electrode plate (compaction density: 3.4 $g/cm^3$), a PP/PE/PP separator and a negative electrode plate (compaction density: 1.6 $g/cm^3$) together are winded to form a bare cell, the bare cell was then plated into a battery case, an electrolyte (EC:EMC in a volume ratio of 3:7, $LiPF_6$:1 mol/L) was injected into the casing, following by sealing, formation, etc., so as to obtain a lithium-ion secondary battery.

Compositions of the batteries according to the Embodiments of the present disclosure and the Comparative Examples are shown in Table 3.

TABLE 1

| Electrode plate No. | Insulation layer Material | D1 | Conductive layer Material | D2 | manufacturing method | RS (Ω/□) | Electrode active material layer Material | Thickness |
|---|---|---|---|---|---|---|---|---|
| Electrode Plate 1# | PI | 6 μm | Al | 300 nm | vacuum evaporation | 0.13 | NCM | 55 μm |
| Electrode Plate 2# | PET | 5 μm | Al | 500 nm | vacuum evaporation | 0.08 | LCO | 55 μm |
| Electrode Plate 3# | PI | 2 μm | Al | 800 nm | vacuum evaporation | 0.05 | NCM | 55 μm |
| Electrode Plate 4# | PET | 10 μm | Al | 1 μm | vacuum evaporation | 0.04 | NCM | 55 μm |
| Electrode Plate 5# | PET | 8 μm | Ni | 1.5 μm | vacuum evaporation | 0.052 | graphite | 70 μm |
| Electrode Plate 6# | PI | 5 μm | Al | 2 μm | vacuum evaporation | 0.02 | NCM | 55 μm |
| Comparative Electrode Plate 1# | PI | 1 μm | Ti | 100 nm | vacuum evaporation | 4.2 | LCO | 55 μm |
| Comparative Electrode Plate 2# | PI | 20 μm | Ag | 3 μm | mechanical rolling | 0.005 | NCM | 55 μm |

TABLE 2

| Electrode Plate No. | Protective layer 1 Material | D3' | Protective layer 2 Material | D3" | RS (Ω/□) |
|---|---|---|---|---|---|
| Electrode Plate 3-1# | / | / | nickel | 1 mm | 0.05 |
| Electrode Plate 3-2# | / | / | nickel oxide | 10 nm | 0.05 |
| Electrode Plate 3-3# | / | / | aluminum oxide | 50 nm | 0.05 |
| Electrode Plate 6-4# | / | / | nickel oxide | 200 nm | 0.02 |
| Electrode Plate 3-5# | nickel | 5 nm | / | / | 0.05 |
| Electrode Plate 3-6# | aluminum oxide | 20 nm | / | / | 0.05 |
| Electrode Plate 3-7# | aluminum oxide | 80 nm | / | / | 0.05 |
| Electrode Plate 6-8# | nickel oxide | 100 nm | / | / | 0.02 |
| Electrode Plate 3-9# | nickel | 5 nm | nickel | 10 nm | 0.05 |

TABLE 2-continued

| Electrode Plate No. | Protective layer 1 | | Protective layer 2 | | RS |
| --- | --- | --- | --- | --- | --- |
| | Material | D3' | Material | D3" | (Ω/□) |
| Electrode Plate 3-10# | nickel oxide | 8 nm | nickel oxide | 10 nm | 0.05 |
| Electrode Plate 3-11# | nickel oxide | 20 nm | nickel oxide | 50 nm | 0.05 |
| Electrode Plate 6-12# | nickel oxide | 30 nm | nickel oxide | 50 nm | 0.02 |
| Electrode Plate 6-13# | nickel oxide | 50 nm | nickel oxide | 100 nm | 0.02 |
| Electrode Plate 6-14# | aluminum oxide | 100 nm | conductive carbon black | 200 nm | 0.02 |

In Table 2, the protective layer 1 is a protective layer located on the surface of the conductive layer body facing the insulation layer (i.e., the lower surface), and has a thickness D3'. The protective layer 2 is a protective layer located on the surface of the conductive layer body away from the insulation layer (i.e., the upper surface), and has a thickness D3". "/" denotes that there is no protective layer.

TABLE 3

| Battery No. | Composition of Electrode Plate | | Cap (Ah) |
| --- | --- | --- | --- |
| Battery 1# | Conventional positive electrode Plate | Conventional negative electrode Plate | 3.2 |
| Battery 2# | Comparative electrode Plate 1# | Conventional negative electrode Plate | 3.2 |
| Battery 3# | Electrode Plate 1# | Conventional negative electrode plate | 3.2 |
| Battery 4# | Electrode Plate 2# | Conventional negative electrode plate | 3.2 |
| Battery 5# | Electrode Plate 3# | Conventional negative electrode plate | 3.2 |
| Battery 6# | Electrode Plate 4# | Conventional negative electrode plate | 3.2 |
| Battery 7# | Conventional positive electrode plate | Electrode Plate 5# | 3.2 |
| Battery 8# | Electrode Plate 6# | Conventional negative electrode plate | 3.2 |
| Battery 9# | Comparative Electrode plate 2# | Conventional negative electrode plate | 3.2 |
| Battery 10# | Electrode Plate 2# | Electrode Plate 5# | 3.2 |
| Battery 11# | Electrode Plate 4# | Electrode Plate 5# | 3.2 |
| Battery 12# | Electrode Plate 1# | Conventional negative electrode plate | 10.5 |
| Battery 13# | Electrode Plate 1# | Conventional negative electrode plate | 48 |
| Battery 14# | Electrode Plate 3-1# | Conventional negative electrode plate | 3.2 |
| Battery 15# | Electrode Plate 3-2# | Conventional negative electrode plate | 3.2 |
| Battery 16# | Electrode Plate 3-3# | Conventional negative electrode plate | 3.2 |
| Battery 17# | Electrode Plate 6-4# | Conventional negative electrode plate | 3.2 |
| Battery 18# | Electrode Plate 3-5# | Conventional negative electrode plate | 3.2 |
| Battery 19# | Electrode Plate 3-6# | Conventional negative electrode plate | 3.2 |
| Battery 20# | Electrode Plate 3-7# | Conventional negative electrode plate | 3.2 |
| Battery 21# | Electrode Plate 6-8# | Conventional negative electrode plate | 3.2 |
| Battery 22# | Electrode plate 3-9# | Conventional negative electrode plate | 3.2 |
| Battery 23# | Electrode Plate 3-10# | Conventional negative electrode plate | 3.2 |
| Battery 24# | Electrode Plate 3-11# | Conventional negative electrode plate | 3.2 |
| Battery 25# | Electrode Plate 6-12# | Conventional negative electrode plate | 3.2 |
| Battery 26# | Electrode Plate 6-13# | Conventional negative electrode plate | 3.2 |
| Battery 27# | Electrode Plate 6-14# | Conventional negative electrode plate | 3.2 |

By further increasing the number of the winding, Battery 12 # and Battery 13 #, which both have a further improved capacitance are obtained.

Experimental Examples:

1. Test method of battery:

A method for testing cycle life of the lithium ion battery was performed as follows.

The lithium ion battery was charged and discharged respectively under 25° C. and 45° C., i.e., the battery was firstly charged at a current of 1C to a voltage of 4.2V, then was discharged with a current of 1C to a voltage of 2.8V, and discharge capacitance after a first cycle was recorded; and the battery was subjected to 1000 cycles of 1C/1C charging-discharging, and discharge capacitance after a $1000^{th}$ cycle was recorded. A capacitance retention rate after the $1000^{th}$ cycle was obtained by dividing the discharge capacitance after the $1000^{th}$ cycle by the discharge capacitance after the first cycle.

Test results are shown in Table 4.

2. Test for internal resistance of battery

An internal resistance instrument (mode: HIOKI-BT3562) was used under a testing environment of room temperature of 23±2° C. Before the test, the positive and negative terminals of the internal resistance instrument were shorted so as to calibrate resistance of zero. During test, the positive and negative electrode tabs of the lithium ion battery to be tested were cleaned, then the positive and negative terminals of the internal resistance instrument were connected to the positive and negative electrode tabs of the lithium ion battery, respectively, and test results were recorded. The coefficient A was calculated from a formula: r=A/Cap.

3. Test method of one-time nailing experiment and six-time consecutive nailing experiment:

(1) One-time nailing experiment: a battery that had been fully charged was fixed, a steel needle with a diameter of 6 mm punctured through the battery at a speed of 25 mm/s at room temperature and remained in the battery, and the battery was observed and measured after the nailing was finished.

(2) Six-time nailing experiment: a battery that had been fully charged was fixed, six steel needles with a diameter of 6 mm successively punctured through the battery at a speed of 25 mm/s at room temperature and remained in the battery, and the battery was observed and measured after the nailing was finished.

(3) Measurement of battery temperature: a multichannel thermometer was used, and the temperature-sensing wires were respectively attached on geometric centers of a nail-inserting surface and an opposite surface of the battery to be nailed; after the nailing was finished, temperature of the battery was measured and tracked for 5 minutes, and the temperature of the battery at the end of 5 minutes was recorded.

(4) Measurement of battery voltage: positive and negative electrodes of each battery to be nailed were connected to test terminals of an internal resistance instrument; after the nailing was finished, a voltage of each battery was measured and tracked for 5 minutes, and the voltage of the battery at the end of 5 minutes was recorded.

Data of the recorded temperatures and voltages of the batteries are shown in Table 5.

TABLE 4

| | Capacitance retention rate after the 1000$^{th}$ cycle | |
|---|---|---|
| Battery No. | 25° C. | 45° C. |
| Battery 1# | 89.2% | 86.5% |
| Battery 2# | 80.0% | 73.8% |
| Battery 4# | 87.0% | 81.0% |
| Battery 5# | 87.3% | 82.1% |
| Battery 8# | 87.9% | 83.2% |
| Battery 14# | 87.7% | 81.9% |
| Battery 15# | 88.2% | 83.2% |
| Battery 16# | 88.7% | 86.2% |
| Battery 17# | 86.9% | 80.5% |
| Battery 18# | 87.9% | 82.1% |
| Battery 19# | 88.4% | 85.9% |
| Battery 20# | 88.6% | 83.4% |
| Battery 21# | 88.6% | 82.1% |
| Battery 22# | 88.2% | 82.8% |
| Battery 23# | 88.5% | 85.2% |
| Battery 24# | 88.7% | 85.3% |
| Battery 25# | 88.6% | 85.7% |
| Battery 26# | 87.9% | 83.5% |
| Battery 27# | 87.4% | 82.1% |

TABLE 5

| | One-time nailing experiment | | Six-time consecutive nailing experiment | |
|---|---|---|---|---|
| Battery No. | Battery temperature rise (° C.) | Battery voltage (V) | Battery temperature rise (° C.) | Battery voltage (V) |
| Battery 1# | 500 | 0 | N/A | N/A |
| Battery 2# | 2.5 | 4.15 | 3.7 | 4.12 |
| Battery 3# | 3.9 | 4.13 | 3.4 | 4.12 |
| Battery 4# | 5.5 | 4.11 | 3.4 | 4.05 |
| Battery 5# | 6.0 | 4.10 | 6.5 | 4.09 |
| Battery 6# | 10.1 | 3.97 | 10.7 | 3.95 |
| Battery 7# | 354 | 0 | N/A | N/A |
| Battery 8# | 17.2 | 3.85 | 17.7 | 3.84 |
| Battery 9# | 430 | 0 | N/A | N/A |
| Battery 10# | 5.5 | 4.10 | 6.1 | 4.09 |
| Battery 11# | 10.2 | 3.95 | 10.8 | 3.93 |
| Battery 14# | 5.9 | 4.11 | 6.6 | 4.10 |
| Battery 15# | 4.9 | 4.14 | 3.4 | 4.08 |
| Battery 16# | 4.3 | 4.11 | 3.4 | 4.09 |
| Battery 17# | 5.5 | 4.15 | 5.2 | 4.14 |
| Battery 18# | 5.7 | 4.10 | 6.2 | 4.08 |
| Battery 19# | 5.4 | 4.11 | 6.5 | 4.10 |
| Battery 20# | 5.1 | 4.09 | 6.2 | 4.07 |
| Battery 21# | 5.7 | 4.12 | 5.1 | 4.12 |
| Battery 22# | 5.4 | 4.14 | 6.0 | 4.12 |
| Battery 23# | 5.1 | 4.13 | 4.0 | 4.04 |
| Battery 24# | 4.4 | 4.11 | 3.6 | 4.05 |
| Battery 25# | 5.5 | 4.14 | 4.8 | 4.08 |
| Battery 26# | 5.3 | 4.12 | 4.7 | 4.10 |
| Battery 27# | 15.4 | 3.92 | 16.1 | 3.90 |

"N/A" indicates that thermal runaway and damage happened immediately after one steel needle punctured through the battery.

TABLE 6

| Battery No. | Cap (Ah) | r (mΩ) | Coefficient A |
|---|---|---|---|
| Battery 4# | 3.2 | 25 | 80 |
| Battery 5# | 3.2 | 10 | 32 |
| Battery 6# | 3.2 | 7.5 | 24 |
| Battery 8# | 3.2 | 7.2 | 23 |
| Battery 12# | 10.5 | 4 | 40.5 |
| Battery 13# | 48 | 2.4 | 115.2 |
| Battery 14# | 3.2 | 10 | 32 |
| Battery 19# | 3.2 | 10 | 32 |
| Battery 23# | 3.2 | 10 | 32 |
| Battery 25# | 3.2 | 7.3 | 23 |
| Battery 27# | 3.2 | 7.4 | 24 |

It can be seen from the results of Table 4 that, compared with Battery 1 # using the conventional positive electrode plate and the conventional negative electrode plate, the batteries using the current collectors according to the embodiments of the present disclosure have a good cycle performance, which is equivalent to the cycle performance of a conventional battery. This indicates that the current collectors according to the embodiments of the present disclosure do not have any adverse influence on the prepared electrode plate and battery. Particularly, the batteries formed by the current collector containing the protective layer have a further improved capacitance retention rate, indicating a higher reliability of the battery.

Figure 22:
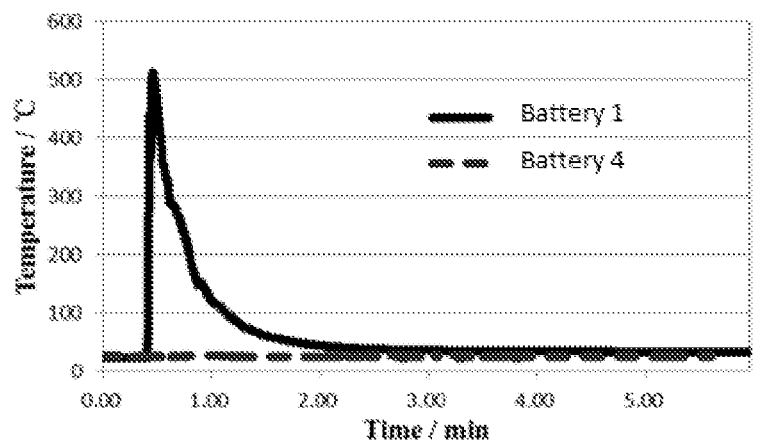
FIG. 22 is a graph of temperature of Battery 1 # and Battery 4 # after one-time nailing experiment.
Figure 23:
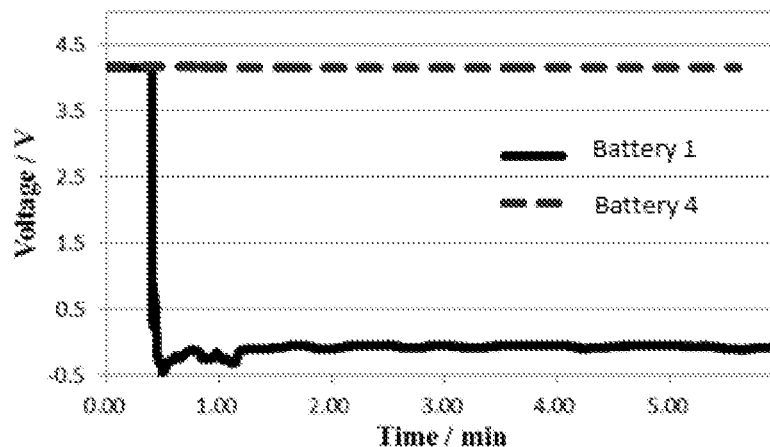
FIG. 23 is a graph of voltage of Battery 1 # and Battery 4 # after one-time nailing experiment.

In addition, the current collectors of the embodiments of the present disclosure can significantly improve safety performance of the lithium ion battery. The graph of temperature of Battery 1 # and Battery 4 # over time are shown in FIG. 22, and the graph of voltage curves time are shown in FIG. 23. From the results in Table 5, FIG. 22 and FIG. 23, it can be seen that temperature of Battery 1 # that did not use the current collector according to the embodiment of the present disclosure rose abruptly by hundreds of degrees and the voltage abruptly dropped to zero at the instant of nailing. This indicates that an internal short circuit happened at the instant of nailing, a large amount of heat was generated, abrupt thermal runaway and damage of the battery occurred, and the battery could not continue to work. Since the thermal runaway and damage of the battery occurred immediately after the first steel needle punctured into the battery, continuous nailing with six steel needles cannot be performed on this type of battery.

In contrast, with respect to the lithium-ion batteries using the current collectors according to the embodiments of the present disclosure, particularly using the current collectors according to the embodiments of the present disclosure as the positive current collector, temperature rise can be basically controlled at about 10° C. or below 10° C., the voltage of the battery substantially kept stable and the battery could operate normally, no matter in one-time nailing experiment or six-time nailing experiment.

Data in Table 6 show that an increase in resistance of the current collector is beneficial to increase the internal resistance r of the battery, further increase the coefficient A, and further increases safety performance of the battery. In particularly, when the capacitance of the battery is great, the current collector with an increased resistance can effectively increase the internal resistance of the battery r, and allow the coefficient A to be kept within a range of large values, thereby improving safety performance of the battery.

Therefore, in case of the internal short circuit of the battery, the current collectors according to the embodiments of the present disclosure can significantly reduce the amount of heat generated by the short circuit, so that the safety performance of the battery is improved. In addition, the damage on the battery caused by the short circuit can be limited to a "point", and thus merely forms a "point break", without affecting the normal operation of the battery in a short time.

The preferable embodiments of the present disclosure are disclosed above but are not used to limit the claims. Those skilled in the art may make possible changes and modifications without departing from the concept of the present disclosure. Therefore, the protection scope of the present disclosure is defined by the attached claims.

What is claimed is:

1. A battery, comprising
a positive electrode plate;
a separator;
a negative electrode plate; and
an electrolyte,
wherein at least one of the positive electrode plate or the negative electrode plate comprises a current collector, and an electrode active material layer formed on a surface of the current collector,
wherein the current collector of at least one of the positive electrode plate or the negative electrode plate comprises an insulation layer and at least one conductive layer, the insulation layer is configured to support the at least one conductive layer, and the at least one conductive layer is configured to support the electrode active material layer;
wherein each of the at least one conductive layer has a room temperature film resistance $R_s$ satisfying $0.01\Omega/\square \leq R_S \leq 0.15\Omega/\square$, and
an internal resistance r of the battery and a capacitance Cap of the battery satisfy $25\ Ah\cdot m\Omega \leq r \times Cap \leq 400\ Ah\cdot m\Omega$.

2. The battery according to claim 1, wherein each of the at least one conductive layer has a room temperature film resistance $R_s$ satisfying $0.02\Omega/\square \leq R_S \leq 0.1\ \Omega/\square$.

3. The battery according to claim 1, wherein each of the at least one conductive layer has a thickness of D2 satisfying $300\ nm \leq D2 \leq 2\ \mu m$.

4. The battery according to claim 1, wherein the insulation layer has a thickness of D1 satisfying $1\ \mu m \leq D1 \leq 20\ \mu m$.

5. The battery according to claim 1, wherein the insulation layer is made of a material selected from a group consisting of an organic polymer insulation material, an inorganic insulation material, a composite material, or combinations thereof,
wherein the organic polymer insulation material is selected from a group consisting of polyamide, polyethylene terephthalate, polyimide, polyethylene, polypropylene, polystyrene, polyvinyl chloride, acrylonitrile-butadiene-styrene copolymer, polybutylene terephthalate, poly-p-phenylene terephthamide, ethylene propylene rubber, polyformaldehyde, epoxy resin, phenol-formaldehyde resin, polytetrafluoroethylene, polyvinylidene fluoride, silicone rubber, polycarbonate, or combinations thereof,
wherein the inorganic insulation material is selected from a group consisting of aluminum oxide, silicon carbide, silicon dioxide, or combinations thereof, and
wherein the composite material is selected from a group consisting of an epoxy resin glass fiber reinforced composite material, a polyester resin glass fiber reinforced composite material, or combinations thereof.

6. The current collector according to claim 1, wherein each of the at least one conductive layer comprises a conductive layer body, a lower protective layer located between the conductive layer body and the insulation layer, and/or an upper protective layer located on a surface of the conductive layer body facing away from the insulation layer,
wherein the lower protective layer and the upper protective layer are each made of a material selected from a group consisting of metal, metal oxide, conductive carbon, or combinations thereof, wherein the metal is selected from a group consisting of nickel, chromium, nickel-based alloy, copper-based alloy, or combinations thereof; the metal oxide is selected from a group consisting of aluminum oxide, cobalt oxide, chromium oxide, nickel oxide, or combinations thereof; and the conductive carbon is selected from a group consisting of conductive carbon black, carbon nanotube, acetylene black, graphene, or combinations thereof, and
wherein the conductive layer body is made of a material selected from a group consisting of a metallic conductive material, a carbon-based conductive material, or combinations thereof, wherein the metallic conductive material is selected from a group consisting of aluminum, copper, nickel, titanium, silver, nickel-copper alloy, aluminum-zirconium alloy, or combinations thereof; and the carbon-based conductive material is selected from a group consisting of graphite, acetylene black, graphene, carbon nanotube, or combinations thereof.

7. The battery according to claim 6, wherein the lower protective layer and the upper protective layer have each a thickness of D3 satisfying $D3 \leq \frac{1}{10}D2$, and $1\ nm \leq D3 \leq 200\ nm$.

8. The battery according to claim 1, wherein each of the at least one conductive layer has a thickness of D2 satisfying $500\ nm \leq D2 \leq 1.5\ \mu m$.

9. The battery according to claim 1, wherein the insulation layer has a thickness of D1 satisfying $2\ \mu m \leq D1 \leq 10\ \mu m$.

10. The battery according to claim 1, wherein the insulation layer has a thickness of D1 satisfying $2\ \mu m \leq D1 \leq 6\ \mu m$.

11. The battery according to claim 6, wherein the lower protective layer and the upper protective layer have each a thickness of D3 satisfying $10\ nm \leq D3 \leq 50\ nm$.

* * * * *